US012749012B2

(12) United States Patent
Livny et al.

(10) Patent No.: US 12,749,012 B2
(45) Date of Patent: Sep. 29, 2026

(54) DISTRIBUTED MACHINE LEARNING MODEL

(71) Applicant: Microsoft Technology Licensing, LLC, Redmond, WA (US)

(72) Inventors: Yotam Livny, Herzliya (IL); Gilad Kirshenboim, Herzliya (IL); Tal Aviv, Herzliya (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 872 days.

(21) Appl. No.: 18/004,868

(22) PCT Filed: May 28, 2021

(86) PCT No.: PCT/US2021/034659
§ 371 (c)(1),
(2) Date: Jan. 9, 2023

(87) PCT Pub. No.: WO2022/020011
PCT Pub. Date: Jan. 27, 2022

(65) Prior Publication Data

US 2023/0351249 A1 Nov. 2, 2023

(30) Foreign Application Priority Data

Jul. 21, 2020 (EP) .................................... 20186976

(51) Int. Cl.
*G06N 20/00* (2019.01)

(52) U.S. Cl.
CPC .................................. *G06N 20/00* (2019.01)

(58) Field of Classification Search
CPC ........ G06N 20/00; G06N 20/20; G06N 3/045; G06N 3/047; G06N 3/084; G06N 7/01; G06N 5/01; G06K 9/6264; G06V 10/7788
See application file for complete search history.

(56) References Cited

U.S. PATENT DOCUMENTS

2018/0240011 A1* 8/2018 Tan .......................... G06F 9/46
2019/0171978 A1 6/2019 Bonawitz
(Continued)

OTHER PUBLICATIONS

Decision to grant a European patent pursuant to Article 97(1) received in European Application No. 21732788.1, mailed on Oct. 9, 2025, 2 pages.
(Continued)

*Primary Examiner* — Dave Misir
(74) *Attorney, Agent, or Firm* — Barta Jones, PLLC

(57) ABSTRACT

A method comprising, by first computer equipment: obtaining an input data point comprising a set of values, each being a value of a different element of an input feature vector; inputting the input data point to a first machine learning model on the first computer equipment to generate at least one associated output label based on the input data point; sending a partial data point to second computer equipment, the partial data point comprising the values of only part of the feature vector; and sending the associated label to the second computer equipment in association with the partial data point, thereby causing the second computer equipment to train a second machine learning model on the second computer equipment based on the sent part and the associated label.

20 Claims, 5 Drawing Sheets

(56) References Cited

U.S. PATENT DOCUMENTS

| | | | | |
|---|---|---|---|---|
| 2019/0318268 | A1* | 10/2019 | Wang | H04L 67/1095 |
| 2020/0027009 | A1 | 1/2020 | Khan et al. | |
| 2020/0090002 | A1 | 3/2020 | Zhu et al. | |
| 2021/0272011 | A1* | 9/2021 | Yonetani | G06N 3/045 |

OTHER PUBLICATIONS

First Office Action received for Chinese Application No. 202180058257.0, mailed on Dec. 1, 2025, 13 Pages. (English Translation Provided).
"Distributed computing-Wikipedia", Retrieved From https://en.wikipedia.org/wiki/Distributed_computing, Jul. 20, 2020, 13 Pages.
"Search Report Issued in European Patent Application No. 20186976.5", Mailed Date: Jan. 29, 2021, 8 Pages.
Liang, et al., "Think Locally, Act Globally: Federated Learning with Local and Global Representations", In Repository of arXiv:2001.01523v3, Jul. 14, 2020, 34 Pages.
Bianco, et al., "CURL: Co-trained Unsupervised Representation Learning for Image Classification", In the Repository of arXiv: 1505.08098v2, Sep. 11, 2015, pp. 01-15.
Blum, et al., "Combining Labeled and Unlabeled Data with Co-Training", In Proceedings of the 11th Annual Conference on Computational Learning Theory, Jul. 24, 1998, pp. 92-100.
Chakravarty, et al., "Active speaker detection with audio-visual co-training", In the Proceedings of the 18th ACM International Conference on Multimodal Interaction, Oct. 31, 2016, pp. 312-316.
"International Search Report and Written Opinion Issued in PCT Application No. PCT/US21/034659", Mailed Date: Sep. 6, 2021, 11 Pages.
Deng, et al., "Adaptive Personalized Federated Learning", In Repository of arXiv:2003.13461v3, Nov. 6, 2020, 50 Pages.
Wiltz, Chris, "Google Is Bringing Al to the Edge for Everyone in 2019", Retrieved From: https://www.designnews.com/electronics-test/google-bringing-ai-edge-everyone-2019, May 7, 2019, 8 Pages.
Gupta, et al., "Watch, Listen & Learn: Co-training on Captioned Images and Videos", In the Proceedings 2008 European Conference on Machine Learning and Knowledge Discovery in Databases, Part I, Sep. 15, 2008, pp. 457-472.
Wu, et al., "Personalized Federated Learning for Intelligent IoT Applications: A Cloud-Edge based Framework", In Journal of Computing Research Repository, May 2, 2020, 9 Pages.
Communication under Rule 71(3) Received for European Application No. 21732788.1, mailed on Jul. 16, 2025, 5 pages.
Notice on Grant received for Chinese Application No. 202180058257.0, mailed on Jun. 4, 2026, 05 pages (English Translation Provided).

* cited by examiner

DISTRIBUTED MACHINE LEARNING MODEL

BACKGROUND

Machine learning refers to the process of training a statistical model based on observed data. For instance one well known form of such a machine learning model is a neural network. A neural network comprises a plurality of nodes which are interconnected by links, sometimes referred to as edges. The nodes and edges are typically implemented in software. The input edges of one or more nodes form the input of the network as a whole, and the output edges of one or more other nodes form the output of the network as a whole, whilst the output edges of various nodes within the network form the input edges to other nodes. Each node represents a function of its input edge(s) weighted by a respective weight, the result being output on its output edge(s). The weights can be gradually tuned based on a set of experience data (training data) so as to tend towards a state where the network will output a desired value for a given input.

FIG. 1A gives a simplified representation of an example neural network 101 by way of illustration. The example neural network comprises multiple layers 102 of nodes 104: an input layer 102*i*, one or more hidden layers 102*h* and an output layer 102*o* (though this layered structure is not essential). In practice, there may be many nodes in each layer, but for simplicity only a few are illustrated. Each node 104 is configured to generate an output by carrying out a function on the values input to that node. The inputs to one or more nodes form the input of the neural network as a whole, the outputs of some nodes form the inputs to other nodes, and the outputs of one or more nodes form the output of the network as a whole.

At some or all of the nodes of the network, the input to that node is weighted by a respective weight. A weight may define the connectivity between a node in a given layer and the nodes in the next layer of the neural network. A weight can take the form of a single scalar value or can be modelled as a probabilistic distribution. When the weights are defined by a distribution, as in a Bayesian model, the neural network can be fully probabilistic and captures the concept of uncertainty. The values of the connections 106 between nodes may also be modelled as distributions. This is illustrated schematically in FIG. 1B. The distributions may be represented in the form of a set of samples or a set of parameters parameterizing the distribution (e.g. the mean $\mu$ and standard deviation $\sigma$ or variance $\sigma^2$).

The network learns by operating on data input at the input layer, and adjusting the weights applied by some or all of the nodes based on the input data. There are different learning approaches, but in general there is a forward propagation through the network from left to right in FIG. 1A, a calculation of an overall error, and a backward propagation of the error through the network from right to left in FIG. 1A. In the next cycle, each node takes into account the back propagated error and produces a revised set of weights. In this way, the network can be trained to perform its desired operation.

The input to the network is typically a vector, each element of the vector representing a different corresponding feature. E.g. in the case of image recognition the elements of this feature vector may represent different pixel values, or in a medical application the different features may represent different symptoms or patient questionnaire responses. The output of the network may be a scalar or a vector. The output may be referred to as a label, e.g. a classification of whether a certain object such as an elephant is recognized in the image, or a diagnosis of the patient in the medical example.

FIG. 1C shows a simple arrangement in which a neural network is arranged to generate a label based on an input feature vector. During a training phase, experience data comprising a large number of input data points X is supplied to the neural network, each data point comprising an example set of values for the feature vector, labelled with a respective corresponding value of the label Y. The label Y could be a single scalar value (e.g. representing elephant or not elephant), or a vector (e.g. a one-hot vector whose elements represent different possible classification results such as elephant, hippopotamus, rhinoceros, etc.). The possible label values could be binary or could be soft-values representing a percentage probability. Over many example data points, the learning algorithm tunes the weights to reduce the overall error between the labelled classification and the classification predicted by the network. Once trained with a suitable number of data points, an unlabelled feature vector can then be input to the neural network, and the network can instead predict the value of the classification based on the input feature values and the tuned weights.

Training in this manner is sometimes referred to as a supervised approach. Other approaches are also possible, such as a reinforcement approach wherein each data point in the input training data is not initially labelled. Instead the learning algorithm begins by guessing the corresponding label for each point, and is then told whether it was correct, gradually tuning the weights with each such piece of feedback. Another example is an unsupervised approach where input data points are not labelled at all and the learning algorithm is instead left to infer its own structure in the training data. The term "training" herein does not necessarily limit specifically to a supervised, reinforcement or unsupervised approach.

A machine learning model can also be formed from more than one constituent neural networks. An example of this is an auto encoder, such as a variational auto encoder (VAE). In an auto encoder, an encoder network is arranged to encode an observed input vector $X_o$ into a latent vector Z, and a decoder network is arranged to decode the latent vector back into the real-world feature space of the input vector. The difference between the actual input vector $X_o$ and the version of the input vector X predicted by the decoder is used to tune the weights of the encoder and decoder so as to minimize a measure of overall difference, e.g. based on an evidence lower bound (ELBO) function. The latent vector Z can be thought of as a compressed form of the information in the input feature space. In a variational auto encoder (VAE), each element of the latent vector Z is modelled as a probabilistic or statistical distribution such as a Gaussian. In this case, for each element of Z the encoder learns one or more parameters of the distribution, e.g. a measure of centre point and spread of the distribution. For instance the centre point could be the mean and the spread could be the variance or standard deviation. The value of the element input to the decoder is then randomly sampled from the learned distribution. Once trained, the auto encoder can be used to impute missing values from a subsequently observed feature vector $X_o$. Alternatively or additionally, a third network can be trained to predict a classification Y from the latent vector, and then once trained, used to predict the classification of a subsequent, unlabelled observation.

It is known to implement a machine learning model on a server system, e.g. on a cloud server system comprising a plurality of server units at different geographic sites. Different client devices of different users can send data which they capture from their devices to the server system in order to train the server-side model.

More recently there has been interest in taking a more distributed approach, whereby a local machine learning model is implemented on each user device as well as a central model being implemented on the server system.

An issue with implementing a model on a server system such as the cloud is the upload bandwidth required to upload large amounts of data such as audio and image data from user devices to the cloud. Another issue is user privacy if the data captured from user's devices is directly uploaded to the cloud.

An approach that has been proposed to address these issues is known as "federated learning". Federated learning is a form of distributed approach, whereby again a model in the form of a neural network is implemented on each of a plurality of client devices and the server system. However instead of sharing the actual training data between models, the model on each of the client devices and the cloud system is trained based on its own local data. In addition, model parameters—i.e. the weights of the neural networks—are shared between the clients and the cloud side, and an algorithm is applied in order to interpolate or mix between the weights from the different constituent models, so as to share the knowledge that has been accumulated the different models without sharing the actual input data.

SUMMARY

However, an issue with the federated learning approach is that this requires all the models to have the same fundamental model architecture. Some federated learning algorithms claim to allow for heterogenous models, but as they are based on sharing model parameters then the models must still share a basic common architecture to at least some extent. Other approaches that are truly heterogenous require sharing of the full training data set from client to server side.

According to one aspect disclosed herein, there is provided a method performed by first computer equipment. The method comprises obtaining an input data point comprising a set of values, each being a value of a different element of an input feature vector, the elements of the input feature vector comprising a plurality of subsets of elements, each subset comprising one or more of the elements of the feature vector. The method then comprises inputting the input data point to a first machine learning model on the first computer equipment to generate at least one associated output label based on the input data point. The method further comprises sending a partial data point to second computer equipment, the partial data point comprising the values of only part of the feature vector, said part comprising one or more of the subsets of elements but not one or more others of the subsets of elements; and sending the associated label to the second computer equipment in association with the partial data point, thereby causing the second computer equipment to train a second machine learning model on the second computer equipment based on the partial data point and the associated label.

In embodiments the first computer equipment may be a client device, and the second computer equipment may be a server system (e.g. a cloud server system comprising multiple server units at different physical locations).

Because the client and server side models (or more generally first and second models) communicate in terms of partial input data points plus output labels, this advantageously avoids the need for sharing the full feature vector from the client, whilst at the same time enabling a fully model-agnostic approach to distributed machine learning. In other words, because the communication between models is only conducted in terms of feature data and labels (the inputs and outputs of the models), and not model parameters (the innards of the models), then the disclosed approach can work between any two machine learning models regardless of their model architectures. For instance these could differ in terms of number of weights or nodes, structure of interconnections between nodes, or even type of machine learning model (e.g. one a VAE and one not, or one a CNN and the other a RNN, or even one comprising a neural network and one another form of machine learning model other than a neural network, etc.). But at the same time, if there is certain select data from the feature vector which is sensitive for privacy reasons, or which would be burdensome to upload in terms of bandwidth, or is not accessible to the server side for some other reason, then this can still be omitted from the data sent to the server. For instance in a machine learning application, the model at the user's side could use both audio and video to add lip reading or facial expressions to inform the learning and prediction. However, the user could avoid the need to upload the video and instead upload only the audio and the labels (in this example the text) generated by their local model. The server-side model can then learn based on the audio and the provided labels. E.g. this could be used to gradually update the training of the server-side model in-the-field based on additional insights from the clients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1A:
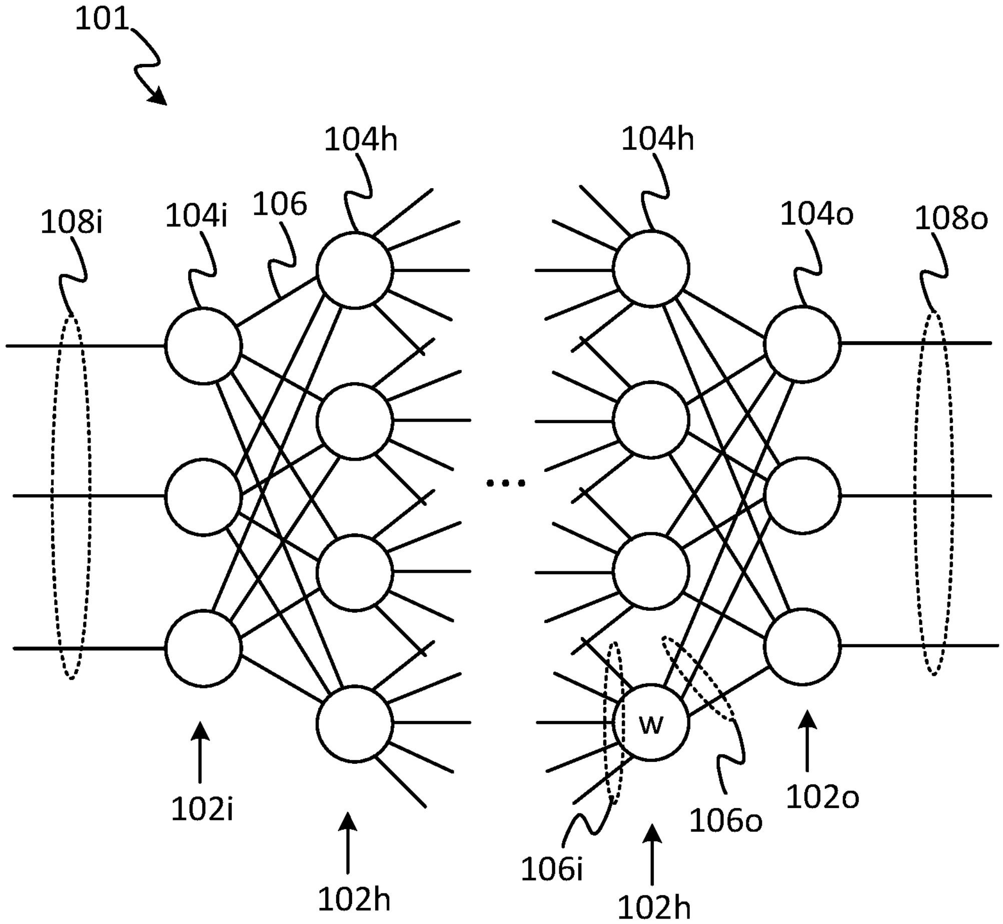
FIG. 1A is a schematic illustration of a neural network.

Consider by way of example an arrangement in which one or more individual client devices (e.g. user devices such as PCs, tablets and smart phones) connect to a cloud server system. A cloud server system has access to vast amounts of data, and also has strong AI processing capabilities. Client devices such as user devices and edge devices can use the cloud as label provider to train local personalized models.

However, it is recognized herein that a client device may have one or more extra input channels that the cloud does not have access to (e.g. camera). In this case the client can use such channels to assist in the verification of AI models. Together with the cloud as an oracle and the client device used to provide additional verification, a hybrid cloud-client machine learning approach will produce superior AI models while enabling a better user experience on the client devices using local personalized models.

In embodiments, the full model is not sent to the client device since the client device may not have enough compute power to run the cloud generated model. If this was required it would impose limits on the cloud model and its quality (which would need to be small enough to run on the client device as well, e.g. on a user device or edge device).

To mitigate limits on quality and compute power on both sides, in embodiments the client device may have a different model design or architecture compared to the cloud model, with the client model being a more lightweight model that is trained based on local data and labels retrieved by sending local data to a strong (and very heavy) cloud model that is used to generate labels.

This way the local model can be personalized and light (solving personalized problems can be done in lightweight models), while the cloud model can be very high quality without imposing any computational limits (and may tackle a bigger generalized problem, with mass data and advanced non-edge research techniques). These two approaches have big differences in term of compute, requirements, and potential quality (without limiting the cloud to user-device or edge-sized model, and using it instead as a label oracle, for example).

In addition, in the disclosed approach, the client may use additional data that is easy to retrieve locally, but not possible or not safe to send into the cloud (quality video, personal locally sensitive data on user). This data can be used to provide further verification to the server-side model (e.g. cloud). Further, this extra data may be used to personalize the model locally on the client device without necessarily imposing model requirements on either side (client and/or cloud) regarding the model architecture and model inputs.

This allows the edge or user device to empower the cloud with locally generated insights that are later transferred to the cloud as improved personalized labels for training a stronger cloud engine, without the need to impose limitations on inputs or other aspects of model design on either side. The cloud may also change its model to a more advanced model without imposing any update requirements nor compute limitations on any device, as each device will enjoy improved label retrieval without changing its local model architecture accordingly.

In embodiments, different client devices (e.g. different user devices or different edge devices) may also have different model designs from one another; whereas in previous, "federated learning" approaches to distributed machine learning models, all devices share the same underlying model design as one another and the cloud, which places limitations on the model design (the model cannot exceed smallest device capabilities, even with a strong cloud).

Figure 2:
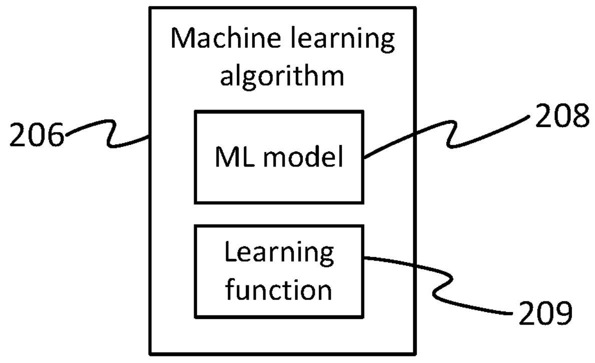
FIG. 2 is a schematic illustration of a computing apparatus for implementing a neural network, FIG. 3 schematically illustrates a data set comprising a plurality of data points each comprising one or more values, FIG. 4 schematically illustrates an example of a distributed arrangement of computer equipment connected over a communication network.

FIG. 2 is a high-level schematic block diagram of a machine learning (ML) algorithm 206. The machine learning algorithm 206 comprises a machine-learning model 208 and a learning function 209. The machine learning model 208 comprises a plurality of parameters which can be tuned based on input data until the model 208 produces a desired or expected output (within some margin of uncertainty or error) for a given input data point. In embodiments the machine learning model 208 comprises one or more neural networks, in which case the parameters may be referred to as weights (not necessarily weights in the sense of multiplicative weights, though that is certainly one possibility). The model 208 could comprise a single neural network as shown schematically in FIG. 1A, or a more complex network structure formed from multiple constituent neural networks, e.g. an auto encoder such as a variational auto encoder (VAE).

A machine learning model is a statistical model that is trained based on observed training data in order to produce a desired or expected output state for a given input state. Commonly a machine learning model 208 may comprise a neural network, but this is not the only possibility and other forms of machine learning model are also known, e.g. another form of Bayesian probability model, or a meta learning model or clustering algorithm.

The machine learning algorithm 206 also comprises a learning function 209 arranged to tune the parameters of the machine learning model 208 according to a learning process based on a set of training data. E.g. in a neural network, the model 208 comprises a network (graph) of nodes each parameterized by one or more weights, which are gradually adapted based on the training data until the output state of the graph best fits the training data for a given set of inputs states in the training data.

In general, a machine learning algorithm 206 may be implemented on any form of computing equipment; e.g. computing equipment comprising one or more user terminals, such as a desktop computer, laptop computer, tablet, smartphone, wearable smart device such as a smart watch, or an on-board computer of a vehicle such as car, etc.; and/or a server system comprising or more physical server units located at one or more geographic sites (e.g. data centres). Where required, distributed or "cloud" computing techniques are in themselves known in the art.

A machine learning algorithm 206 is implemented in the form of software (code) embodied on computer readable storage and run on processing apparatus of the respective computer equipment. The computer equipment in question may comprise one or more general purpose processors such as central processing units (CPUs); and/or one or more work accelerator co-processors such as graphics processing units (GPUs), machine learning accelerator processors, digital signal processors (DSPs) and/or crypto-processors. Any such processor may take the form of a classical transistor-based Boolean processor, or another form such as a quantum processor or biological processor. The one or more processors may be implemented on one or more computer terminals or units at one or more geographic sites. The storage (i.e. memory) on which the code is stored may comprise one or more memory devices, e.g. a hard drive, removable storage device, ROM (read-only memory), or RAM (random access memory). The memory may employ one or more memory media, e.g. an electronic medium such as EEPROM, flash memory, or static or dynamic RAM; or a magnetic medium such as a magnetic disk or tape; or an optical medium such as an optical disk or quartz glass. The memory may be implemented on one or more computer terminals or units at one or more geographic sites.

The learning function 209 is arranged to gather observations (i.e. observed values) of various features of an input feature space. It may for example be arranged to collect inputs entered by one or more users via a UI front end, e.g. touch screen, point and click interface, text interface, voice interface, etc.; or to automatically collect data from unmanned devices such as sensor devices. The learning function 209 can then train the model 208 based on the gathered observations (i.e. data).

FIG. 1A illustrates the principle behind a neural network. A neural network 101 comprises a graph of interconnected nodes 104 and edges 106 connecting between nodes, all implemented in software. Each node 104 has one or more input edges and one or more output edges, with at least some of the nodes 104 having multiple input edges per node, and at least some of the nodes 104 having multiple output edges per node. The input edges of one or more of the nodes 104 form the overall input 108*i* to the graph (typically an input vector, i.e. there are multiple input edges). The output edges of one or more of the nodes 104 form the overall output 108*o* of the graph (which may be an output vector in the case where there are multiple output edges). Further, the output edges of at least some of the nodes 104 form the input edges of at least some others of the nodes 104.

Each node 104 represents a function of the input value(s) received on its input edges(s) 106*i*, the outputs of the function being output on the output edge(s) 106*o* of the respective node 104, such that the value(s) output on the output edge(s) 106*o* of the node 104 depend on the respective input value(s) according to the respective function. The function of each node 104 is also parametrized by one or more respective parameters w, sometimes also referred to as weights (not necessarily weights in the sense of multiplicative weights, though that is certainly one possibility). Thus the relation between the values of the input(s) 106*i* and the output(s) 106*o* of each node 104 depends on the respective function of the node and its respective weight(s).

Figure 1B:
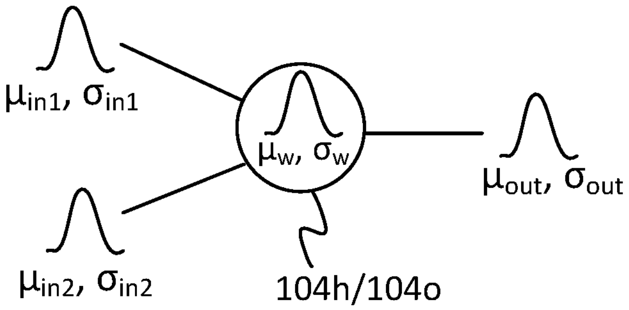
FIG. 1B is a schematic illustration of a node of a Bayesian neural network.

Each weight could simply be a scalar value. Alternatively, as shown in FIG. 1B, at some or all of the nodes 104 in the network 101, the respective weight may be modelled as a probabilistic distribution such as a Gaussian. In such cases the neural network 101 is sometimes referred to as a Bayesian neural network. Optionally, the value input/output on each of some or all of the edges 106 may each also be modelled as a respective probabilistic distribution. For any given weight or edge, the distribution may be modelled in terms of a set of samples of the distribution, or a set of parameters parameterizing the respective distribution, e.g. a pair of parameters specifying its centre point and width (e.g. in terms of its mean and standard deviation $\sigma$ or variance $\sigma^2$). The value of the edge or weight may be a random sample from the distribution. The learning of the weights may comprise tuning one or more of the parameters of each distribution.

As shown in FIG. 1A, the nodes 104 of the neural network 101 may be arranged into a plurality of layers, each layer comprising one or more nodes 104. In a so-called "deep" neural network, the neural network 101 comprises an input layer 102*i* comprising one or more input nodes 104*i*, one or more hidden layers 102*h* (also referred to as inner layers) each comprising one or more hidden nodes 104*h* (or inner nodes), and an output layer 102*o* comprising one or more output nodes 104*o*. For simplicity, only two hidden layers 102*h* are shown in FIG. 1A, but many more may be present.

The different weights of the various nodes 104 in the neural network 101 can be gradually tuned based on a set of experience data (training data), so as to tend towards a state where the output 108*o* of the network will produce a desired value for a given input 108*i*. For instance, before being used in an actual application, the neural network 101 may first be trained for that application. Training comprises inputting experience data in the form of training data to the inputs 108*i* of the graph and then tuning the weights w of the nodes 104 based on feedback from the output(s) 108*o* of the graph. The training data comprises multiple different input data points, each comprising a value or vector of values corresponding to the input edge or edges 108*i* of the graph 101.

Figure 1C:
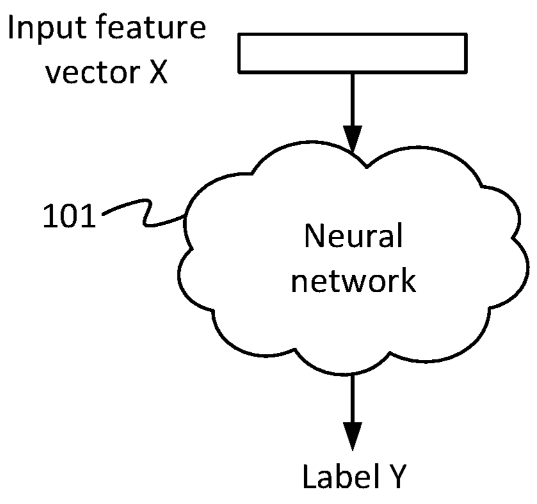
FIG. 1C is a schematic illustration of a neural network arranged to predict a classification based on an input feature vector.

For instance, consider a simple example as in FIG. 1C where the machine-learning model comprises a single neural network 101, arranged to take a feature vector X as its input 108*i* and to output a label Y as its output 108*o*. The input feature vector X comprises a plurality of elements $x_d$, each representing a different feature d=0, 1, 2, . . . etc. E.g. in the example of image recognition, each element of the feature vector X may represent a respective pixel value. For instance one element represents the red channel for pixel (0,0); another element represents the green channel for pixel (0,0); another element represents the blue channel of pixel (0,0); another element represents the red channel of pixel (0,1); and so forth. As another example, where the neural network is used to make a medical diagnosis, each of the elements of the feature vector may represent a value of a different symptom of the subject, physical feature of the subject, or other fact about the subject (e.g. body temperature, blood pressure, etc.).

Figure 3:
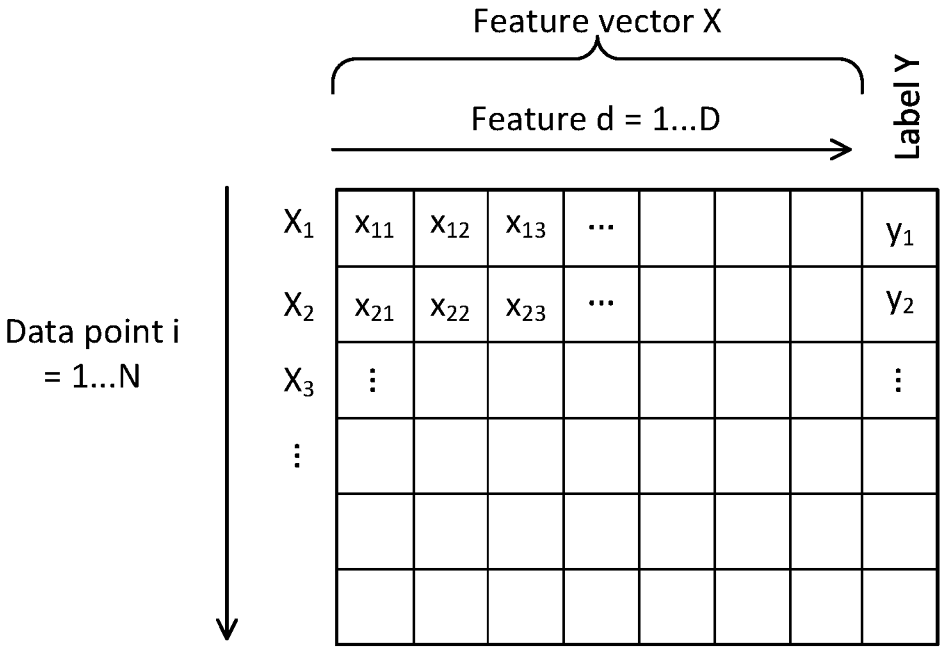

FIG. 3 shows an example data set comprising a plurality of data points i=0, 1, 2, . . . etc. Each data point i comprises a respective set of values of the feature vector (where $x_{id}$ is the value of the $d_{th}$ feature in the $i_{th}$ data point). The input feature vector $X_i$ represents the input observations for a given data point, where in general any given observation i may or may not comprise a complete set of values for all the elements of the feature vector X. The label $Y_i$ represents a corresponding classification of the observation i, generated by the network based on the input. In the training data an observed value of label $Y_i$ may be specified with each data point along with the observed values of the feature vector elements. In subsequent a prediction phase, a value of the label Y is predicted by the neural network 101 for a further input observation X.

The label Y could be a scalar or a vector. For instance in the simple example of the elephant-recognizer, Y could be a single binary value representing either elephant or not elephant, or a soft value representing a probability or confidence that the image comprises an image of an elephant. Or similarly, if the neural network 101 is being used to test for a particular medical condition, Y could be a single binary value representing whether the subject has the condition or not, or a soft value representing a probability or confidence that the subject has the condition in question. As another example, Y could comprise a "1-hot" vector, where each element represents e.g. a different animal or condition. E.g. Y=[1, 0, 0, . . . ] represents an elephant, Y=[0, 1, 0, . . . ] represents an hippopotamus, Y=[0, 0, 1, . . . ] represents a rhinoceros, etc. Or if soft values are used, Y=[0.81, 0.12, 0.05, . . . ] represents an 81% confidence that the image comprises an image of an elephant, 12% confidence that it comprises an image of an hippopotamus, 5% confidence of a rhinoceros, etc.

In the training phase, the true value of $Y_i$ for each data point i is known. With each training data point i, the ML algorithm 206 measures the resulting output value(s) at the output edge or edges 108*o* of the graph, and uses this feedback to gradually tune the different weights w of the various nodes 104 so that, over many observed data points, the weights tend towards values which make the output(s)

108*i* (Y) of the graph 101 as close as possible to the actual observed value(s) in the experience data across the training inputs (for some given measure of overall error). I.e. with each piece of input training data, the predetermined training output is compared with the actual observed output of the graph 108*o*. This comparison provides the feedback which, over many pieces of training data, is used to gradually tune the weights w of the various nodes 104 in the graph toward a state whereby the actual output 108*o* (Y) of the graph will closely match the desired or expected output for a given input 108*i*. Examples of such feedback techniques include, for instance, stochastic back-propagation.

Once trained, the neural network 101 can then be used to infer a value of the output label 108*o* (Y) for a given value of the input vector 108*i* (X), or vice versa.

Explicit training based on labelled training data is sometimes referred to as a supervised approach. Other approaches to machine learning are also possible. For instance another example is the reinforcement approach. In this case, the neural network 101 begins making predictions of the label $Y_i$ for each data point i, at first with little or no accuracy. After making the prediction for each data point i (or at least some of them), the ML algorithm 206 receives feedback (e.g. from a human) as to whether the prediction was correct, and uses this to tune the weights so as to perform better next time. Another example is referred to as the unsupervised approach. In this case the ML algorithm receives no labelling or feedback and instead is left to infer its own structure in the experienced input data.

FIG. 1C shows a simple example of the use of a neural network 101, where a single neural network is used to predict a label Y from an input vector X. In some more complex cases, the machine-learning model 208 may comprise a structure of two or more constituent neural networks 101, such as a VAE.

Figure 4:
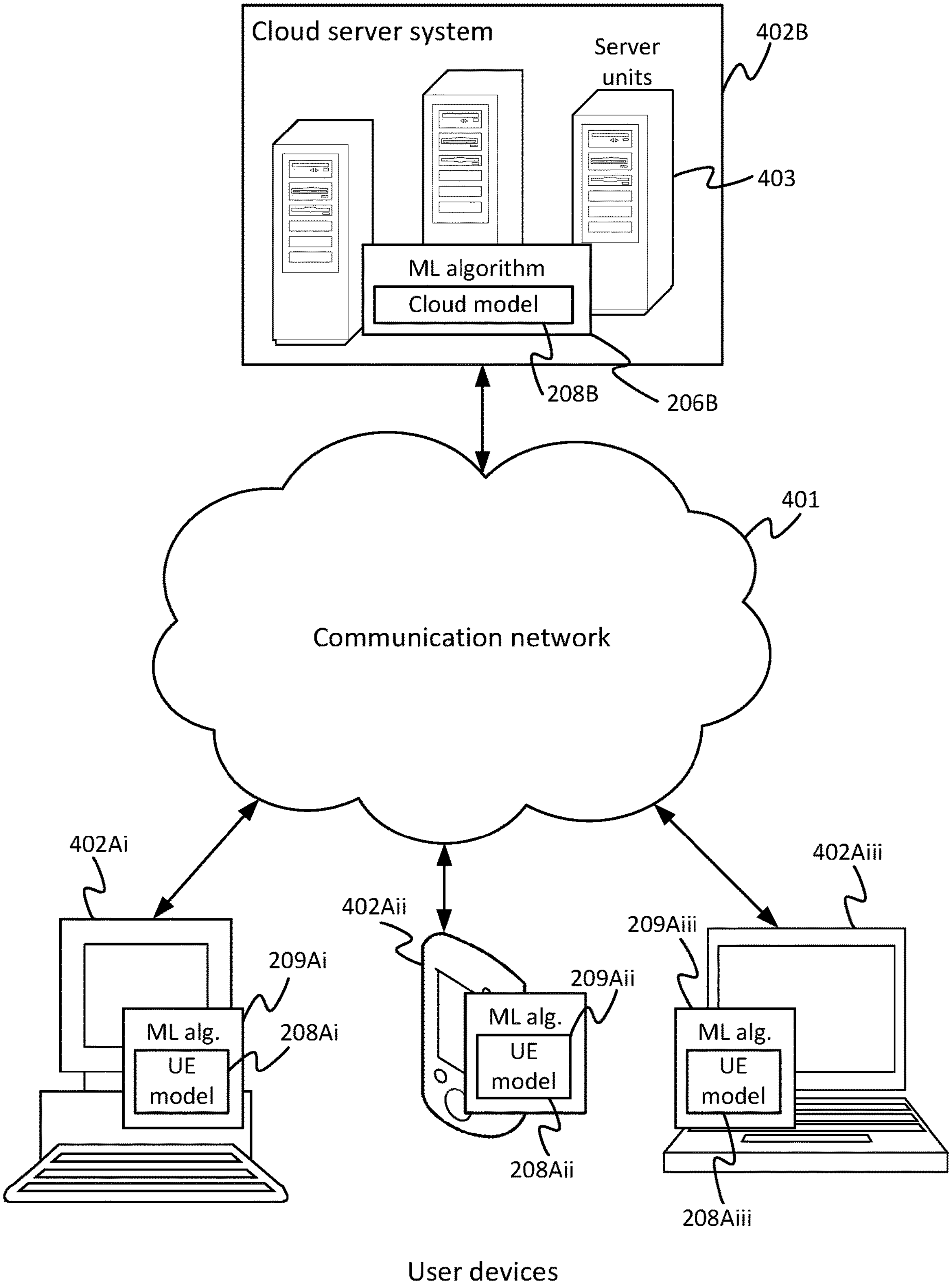

FIG. 4 shows an example arrangement in accordance with embodiments disclosed herein. The arrangement comprises a plurality of computer systems 402. These comprise at least a server system 402B and one or more client devices 402A. The server system 402B comprises one or more server units 403 located at one or more geographic sites. In embodiments the server system 402 may take the form of a cloud server system comprising a plurality of server units 403 at different geographic sites (e.g. in different data centres). Each client device 402A comprises one or more units of client computer equipment. The server unit(s) 403 and client device(s) 402A are all connected to one another via a communication network 401, which may comprise one or more constituent networks; for example a wide-area internetwork such as the Internet, a mobile cellular network such as a 3GPP network, a wired local area network (LAN) such as an Ethernet network, and/or a wireless LAN such as a Wi-Fi, Thread, ZigBee or 6LoWPAN network, etc.

In embodiments, one some or all of the client devices each comprise a user device. A given user device may comprise one or more units of user equipment (i.e. one or more user terminals). Alternatively or additionally, one, some or all of the client devices 402A may each comprise an edge device. An edge device is a device comprising one or more pieces of edge equipment, e.g. access points and/or routers, which provide an entry point for one or more user devices to the communication network 401. Three user devices 402Ai, 402Aii, 402Aiii are shown in FIG. 4 as examples of the client devices 402A, but it will be appreciated that this is just by way of illustration and other numbers of the same or different types of client devices 402A may be involved in the arrangement.

The arrangement of FIG. 4 may be used to implement a distributed machine learning model. The distributed model comprises an individual constituent machine learning model 208B, 208Ai, 208Aii, 208Aii, etc. on each of the server system 402B and client devices 402Ai, 402Aii, 402Aiii respectively. Each forms part of a respective machine learning algorithm 206B, 206Ai, 206Aii, 206Aiii implemented on the respective computer equipment. Each algorithm 206 is implemented on memory of its respective computer equipment and arranged to run on respective processing apparatus of that computer equipment, as discussed previously in relation to FIG. 2. Each algorithm 206 may be configured in accordance with the principles described in relation to FIG. 2. However, the models on the server system 402B and client device(s) 402A—referred to herein as the client-side and server-side models 208B, 208A respectively—may have a different design than one another. For example, the server-side model 208B may be more complex (e.g. more weights, nodes and/or input edges, and or a more complex model structure). This will require more memory and/or processing resource to implement, which the server system 402 will have. Whereas the client-side model 208A may be less complex but more personalized to a particular application or circumstance of the respective client device 402A. In some cases the different models 208B, 208A could even be of different types, e.g. one being a convolutional neural network (CNN) and another a recurrent neural network (RNN), or once comprising a VAE and one not. Additionally, or alternatively, the models 208Ai, 208Aii on two or more different client devices 402Ai, 402Aii may have different model designs, e.g. so as to be tailored to two different applications or circumstances of those different client devices.

Figure 5:
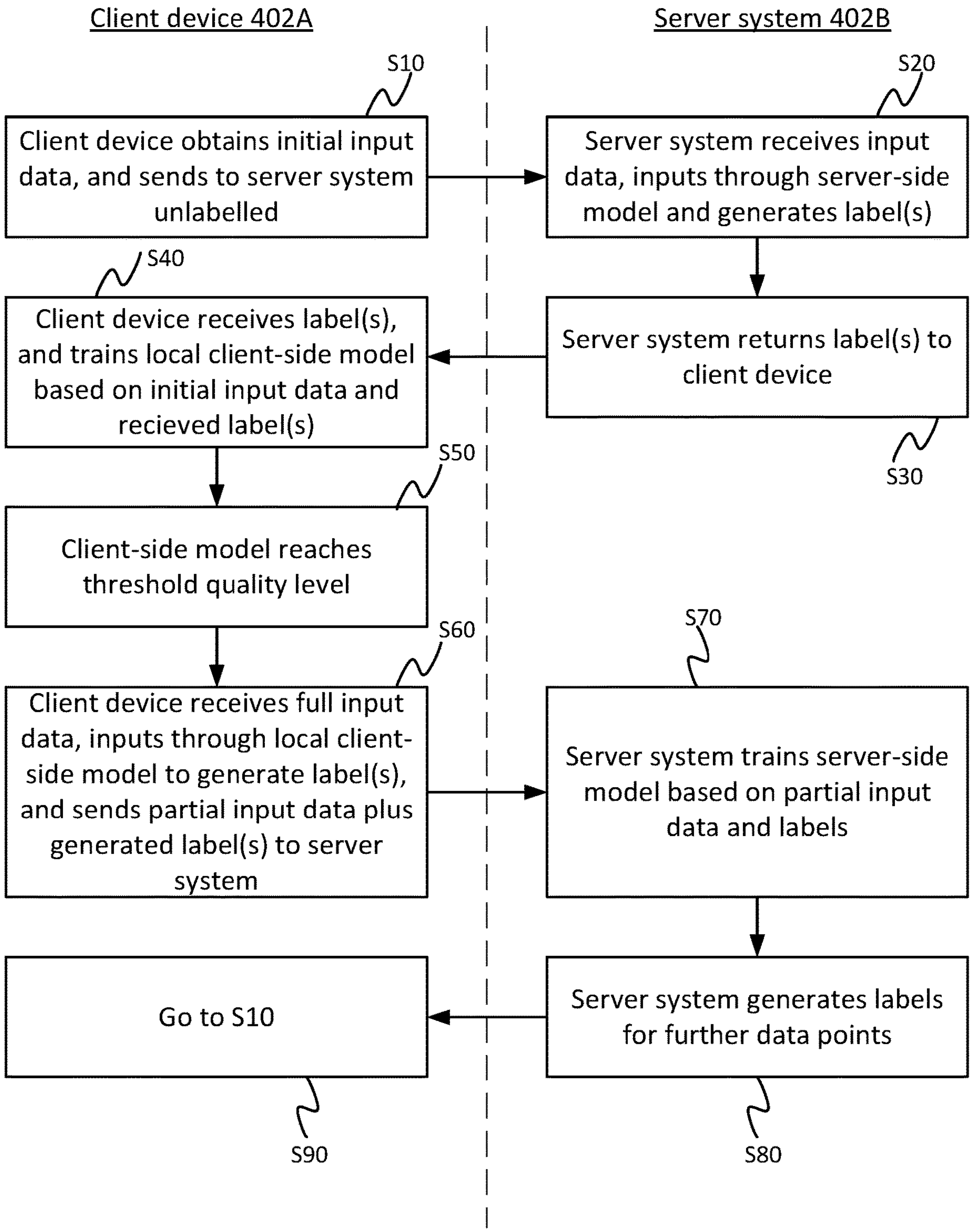
FIG. 5 is a schematic flow chart showing a method of operating a distributed machine learning model in accordance with embodiments disclosed herein.

FIG. 5 shows an overall method that may be performed in accordance with embodiments disclosed herein. Steps S10, S40, S50, S60 S90 form a constituent method that may be performed by a client device 402A. By way of illustration this method will be described from the perspective of a particular client device 402Ai, but it will be appreciated that that same method could be implemented on any client device 402A. Steps S20, S30, S70 and S80 form a constituent method that may be performed by the server system 402B. Steps S10 to S50 and S80 to S90 are optional.

The client device 402Ai has available a certain vector of features on which it can collect data. For instance, take the example of speech-to-text conversion. In this case the feature vector may comprise a first subset of elements representing audio samples of a person's speech, and a second subset of elements representing video samples which may include video of the person's lips or face while speaking the speech. Alternatively or in addition to the video, the available feature vector could also include other elements, e.g. one or more metadata fields for including proximity information representing a proximity of the person from the microphone when speaking, or light level information giving information on a light level in which the video was captured, etc.

The data values for the feature vector may be sampled locally on the client device 402Ai, or gathered from one or more external sources, or a combination. For instance in the case of the speech-to-text conversion, the audio and video may be captured using an onboard microphone and camera, and any proximity or light level information (if used) may be sampled from one or more onboard sensors. As another example, if the feature vector comprises medical information, the information could be sampled from one or more internal or external sensors of the client device 402Ai, and/or input as survey information through a user interface of the client device 402Ai. E.g. there may be provided a manual insights tool (such as to allow a user to type in a correct/wrong tag as an extra verification input). Not only technological sensors can add local insights. Another example of a local input could be repeating the same action (saying something for example to voice control) until getting the right output, which can indicate all previously inserted un-clear inputs are actually labelled by the same output for training.

At step S10 the client device 402Ai collects one or more initial data points, each comprising a set of values of some or all the elements of an input feature vector. Each of the initial data points may be a full data point comprising values of all the elements of the feature vector, or may be a partial data point comprising values of only some of the elements of the feature vector. In embodiments each of these initial data points comprises only a part of the feature vector (e.g. only the audio and not the video or metadata). The client device 402Ai sends the initial data points to the server system 402B. At this stage the client-side model 208Ai may be untrained or poorly trained, and thus not able to produce good labels from the data points itself.

At step S20, the server system 402B receives the initial data points and inputs them through the server-side model 208B to generate a respective label from each of them (e.g. text from the speech samples in the speech-to-text example). The label could comprise an absolute value or a probability (soft value), or a value and an associated probability. The server-side model 208B is already pre-trained, e.g. based on data sourced from multiple other client devices 402A, and is thus able to produce good labels. At step S30 the server system 402B sends back the generated labels to the client device 402Ai.

At step S40, the local model 208A on the client device 402Ai is trained using the server-side (e.g. cloud) generated labels as a reference. The data points plus the labels provide labelled training data from which the client-side model 208Ai can be trained. For example, the cloud speech model 208B translates the input audio to text labels to then use as training data to train the client-side speech model 208Ai.

Note that FIG. 5 is somewhat schematized and in practice the server system 402B could be sent the data points, pass them through the server-side model 208B and return them to the client 402Ai to perform the training in an ongoing or pipelined fashion, rather than having to queue up multiple data points before inputting them all through the model 208B then return the results en masse.

At step S50, at some point the client device 402Ai detects that the local client-side model 208Ai has reached some specified threshold quality, e.g. cloud quality. The quality may be measured for example in terms of an uncertainty, error or confidence value output by the client-side model 208A. The ability to generate such measures of a model's quality per se is known in the art. By whatever means measured, once the client side-model 208A has reached the threshold quality, the client device 402Ai may then start to use its own client-side model 208Ai locally to generate labels for further data points, rather than continuing to revert to the server 402B for labels. Alternatively the client device 402Ai may start to use its own model and continue send further data points to the server system 402B in parallel, to continue training in accordance with steps S10-S40 in parallel with using its own local model 208Ai to make predictions. Or in some cases the client device 402Ai may only revert to the server system 402B for a label in certain circumstances, e.g. if it encounters a word it cannot recognize or cannot recognize with a high confidence.

Note that steps S10-S50 are not essential. In other implementations the client-side model 208Ai could be trained in some other manner, e.g. it could be a pre-trained model that was trained offline before deployment on the client device 402Ai.

By whatever means the client-side model 208Ai is initially trained, according to the teachings disclosed herein it can then be used to provide verification to help train the server-side model 208B. The client device 402Ai has available extra channels of input that are not necessarily made available to the server system 402B, but which may provide a strong quality verification. For example such data may comprise camera data, proximity data, distance data, and/or data on the light in the room, etc. In other words the input feature vector available to the model 208Ai on the client device 402Ai comprises one or more additional fields (one or more additional subsets of elements) than the vector that may be made available from the client device 402Ai to the model 208B on the server system 402B. For instance in the speech-to-text conversion example, the user of the client device 402Ai may capture audio and video of the person talking. However for privacy or bandwidth reasons, or both, the user may not wish or even be allowed to upload the video to the server system 402B, and may only upload the audio. And/or, metadata such as the sensor or manual data may not be accessible to the server system 402B, perhaps because it is not configured to access or be able to access such data (e.g. this data is not available in a standardized form such that the server system cannot collect the metadata from the various different client devices 402Ai, 402Aii, 402Aiii). Nonetheless, the video, sensor data and/or manual input data may contain powerful cues that would assist in speech-to-text conversion; e.g. the lips or facial expressions in the video, or proximity data from the sensors, etc.

To make use of such additional information, then according to the techniques disclosed herein, the client device 402Ai and server system 402B may be configured to perform the following method steps. These steps occur after the initial training phase of at least the client-side model 208Ai (by whatever means it is initially trained). They may also be performed after an initial training phase of the server-side model 208B, and used to improve the training of the server side model 208B. E.g. verification may be provided in an ongoing manner to adapt the training of the server-side model 208B "in-the-filed", i.e. after deployment during a live use phase of the model 208B in which it is used to provide an actual service to users (e.g. over the Internet). However it is not excluded that the following steps could alternatively, or additionally, be used as part of an initial training phase of the server-side model 208B.

At step S60, the client device 402Ai takes values of the full feature vector (i.e. a data point with values of all the elements of all the available fields of the feature vector) and inputs this through its own local model 208Ai in order to generate an output label. The label may comprise an absolute value or a probability (soft value), or a value and an associated probability. For instance in the speech-to-text example, step S60 may comprise inputting the audio and video data to the client-side model 208A, and perhaps any available sensor data or other such metadata, in order to generate text (the output label) based on all of this available information. The output could also include a probability associated with the predicted text. The extra data on top of the audio provides additional relevant information which can potentially inform the prediction of the text. E.g. the video may contain a moving image of the speaker's lips or face which would add additional information into the mix to inform the generation of the text.

The client device 402Ai then sends only a partial version of the data point to the server system 402B, comprising values for only one or some of the fields of the feature vector but not others (i.e. for only one or some of the subsets of elements of the feature vector). E.g. it may comprise audio samples but not video, and/or not any of the sensor data or other such metadata (e.g. manual input data). However, the client device 402Ai does send to the server system 402B the corresponding label which the client device 402A generated based on the full feature vector and its own local model 208Ai.

At step S70, the server system 402B trains the server-side model 208B based on the partial data point and the label received from the client device 402Ai, e.g. by updating the weights of a neural network. The partial data point plus the label provide labelled training data that can improve the training of the server-side model 208B. Both mistakes by the client-side model 208Ai and good verification may be sent to the cloud as an extra learning cycle which in turn lead to a better cloud model based on the client insights on the desired output.

At some subsequent time, at step S80, the updated server-side model 208B may be used to generate one or more further labels corresponding to one or more new further data points (which may also comprise only one or some fields of the feature vector, as with the data point sent to the server at step S60). For instance, in some cases, at step S90 the method may return to step S10 and repeat steps S10-S40 using the updated version of the server-side model 208B and its output labels as improved references. Alternatively or additionally, the further data points could be received as queries from one or more other client devices 402Aii, 402Aiii, etc., in order for the server system to generate labels to provide back to those other client devices. For example this could be used to provide a labelling service to clients 402Aii, 402Aiii that don't have values of the full feature vector available and/or do not have a good local model of their own, or to help with the training of their local models (i.e. used to perform steps S10-S50 for another client device 402Aii or 402Aiii, etc.).

While examples above have been described in terms of speech-to-text conversion, it will be appreciated that this is not limiting. For instance another example would be image recognition, such as used in an autonomous driving, people recognition, or any other application. In this case the partial data sent to the server system 402B may comprise the image data, and the additional data available only to the client device 402Ai may comprise inertial sensor data from one or more sensors measuring motion of a camera or cameras which captured the image data. This extra data can help for example by adding an insight as to when the image is more likely to be blurred.

Yet another example would be in the medical field where the output label comprises a prediction of a condition (e.g. illness) of a subject. The input feature vector may comprise medial image data; other measurements taken from the subject's body (e.g. body temperature, blood pressure, etc.); and/or survey data answered by or about the subject. It may be desired to only make some of this information available to the cloud.

Whatever the application, note that the client device 402A and server system 402B only ever need to communicate with one another in terms of partial input data points and output labels, not parameters of the models 208B, 208A as in the federated learning case. This enables different models to communicate with one another regardless of their model architecture or design. At the same time, the client 402A need not share the full feature vector with the server system (e.g. cloud). This may be advantageous for reasons of privacy or bandwidth, for example.

It will be appreciated that the above embodiments have been described by way of example only.

For instance, while embodiments above have been described in terms of a server-side model which has a higher complexity than the client-side model, this is not necessarily the case in all possible applications. E.g. a quantum-computer may have a higher complexity model than cloud. Or in some cases, one model may be more complex in some respects, such as having only voice input but being a larger network, while the other model may be more complex in other respects, such as having smaller network but with added video input.

Further, while the above has been described in terms of a client device and server system, the same principles could be extended to any first computer equipment and second computer equipment implementing first and second machine learning models respectively. In general any two models may collaborate to achieve a higher quality than any one of them individually, such as two peers, e.g. devices in a smart home. For example the first device could be a PC and the second device a mobile device such as a smart phone, where the models on PC and mobile may have different architecture and/or inputs, and may support each other. Other examples could include PC, TV, mobile etc. The cloud is not mandatory also a server-client relationship is not mandatory, as long the models communicate in terms of feature data and labels so as to collaborate with one another.

Furthermore, the disclosed techniques are not limited to use on just one cloud model, and could be used on two or more cloud models, for example one model for a technical domain, and another model for a general domain. These two models may both be in the cloud and can have different inputs and architecture. One example would be speech for general-medial conversations vs. a model dedicated for medical covid-19 conversations. The specific covid-19 may include different inputs such as known symptoms fields that doesn't exists in general medical model. These two models can be different but can both be on the cloud and provide support to clients and receive verification from clients as described herein. In addition, more cloud models may comprise a general (non-medical) conversation models and/or a model for another disease such as flu or cancer models (etc.). All these may be able to communicate common inputs and/or labels in collaborative manner (not only server/cloud-edge).

In yet further variants, the machine learning model is not limited to a neural network. Other types of machine learning model are also known in the art and may be used for either or both of the machine learning models. Such other forms of machine learning model include for example Markov, random-forests, collaborative filtering, KNN and other unsupervised-clustering etc. All can share diverse inputs and outputs if one removes architecture limits and shares training insights among them.

More generally, according to one aspect disclosed herein, there is provided a method comprising, by first computer equipment: obtaining an input data point comprising a set of values, each being a value of a different element of an input feature vector, the elements of the input feature vector comprising a plurality of subsets of elements, each subset comprising one or more of the elements of the feature vector; inputting the input data point to a first machine learning model on the first computer equipment to generate at least one associated output label based on the input data point; sending a partial data point to second computer equipment, the partial data point comprising the values of only part of the feature vector, said part comprising one or more of the subsets of elements but not one or more others of the subsets of elements; and sending the associated label to the second computer equipment in association with the partial data point, thereby causing the second computer equipment to train a second machine learning model on the second computer equipment based on the partial data point and the associated label.

E.g. each of the machine learning models may comprise a neural network.

Said obtaining of the data point may comprise capturing values from one or more internal sources of the first computer equipment (e.g. sensors or a user interface), or receiving values from an external source (e.g. another client device), or a combination.

In embodiments the second model may have a higher complexity than the first model. The higher complexity model will consume more memory and/or processing resources to implement. For instance the higher complexity may comprise more model parameters (e.g. weights in the case of a neural network), and/or more nodes (in the case of a neural network). As another example, the second model may comprise a more complex model structure than the first model (e.g. a VAE as opposed to a single neural network, etc.).

In embodiments the second computer equipment may comprise a server system and the first computer equipment may comprise a client device. The server system may comprise one or more server units at one or more geographic sites. In some embodiments the server system may comprise a cloud server system comprising a plurality of server units at different sites.

In embodiments the client device may comprise a user device. Alternatively the client device may be an edge device providing an entry point between one or more user devices and a communication network connecting the user equipment to the server system.

In embodiments, one of the plurality of subsets may comprise an audio field, the values of which comprise audio data of a person's speech, and another of the plurality of subsets may comprises a video field, the values of which comprise video data of the person's lips or face while speaking said speech. In some such embodiments the first model may be arranged to perform speech-to-text conversion based on the input feature vector, and the second model may be arranged to perform the speech-to-text conversion based on said part of the feature vector, the output label comprising the text. As an example, said part of the feature vector may comprise the audio field but not the video field.

In embodiments, one of the plurality of subsets may comprise an image field, the values of which comprise image data, and another of the plurality of subsets may comprise an inertial sensor data field, the values of which comprise inertial sensor data from one or more sensors measuring motion of a camera while capturing the image data. In some such embodiments the first model may be arranged to perform image recognition to detect an object based on the input feature vector, and the second model may be arranged to perform the image recognition based on said part of the input feature vector, the output label comprising an indication of the object. As an example, said part of the feature vector comprises the image data field but not the inertial sensor data field.

In embodiments the method may further comprise, by the first computer equipment in an initial training phase prior to the obtaining of said input data point: obtaining a plurality of initial data points, each comprising a respective set of values of some or all of the subsets of elements of said feature vector; sending each of said plurality of initial data points to the second computer equipment, and in response, receiving back associated labels generated by the second model based on the initial data points; and training the first model based on the initial data points and the associated labels received from the second computer equipment. Said some or all of the subsets may be said part of the feature vector.

In further embodiments, the method may yet further comprise, by the first computer equipment in a subsequent training phase following the sending of the label to the second computer equipment: sending a further data point to the second computer equipment, the further data point comprising values of some or all of the subsets of elements of the feature vector, and in response receiving back a further label generated by the second model based on the further data point; and updating the training of the first model based on the further label and further data point. Again said some or all of the subsets may be said part of the feature vector.

According to another statement of the teachings disclosed herein, there is provided a method comprising, by first computer equipment: obtaining an input data point comprising a set of values of all elements of an input feature vector, each being a value of a different element of the input feature vector, the input feature vector comprising a plurality of fields, each field comprising one or more of the elements of the feature vector; inputting the input data point to a first machine learning model on the first computer equipment to generate at least one associated output label based on the input data point; sending a partial data point to second computer equipment, the partial data point comprising the values of only part of the feature vector, said part comprising one or more of the fields of the feature vector but not one or more others of the fields; and sending the associated label to the second computer equipment in association with the partial data point, thereby causing the second computer equipment to train a second machine learning model on the second computer equipment based on the partial data point and the associated label.

In embodiments, one of the plurality of fields may comprise an audio field, the values of which comprise audio data of a person's speech, and another of the plurality of fields may comprise a video field, the values of which comprise video data of the person's lips or face while speaking said speech; wherein the first model may be arranged to perform speech-to-text conversion based on the input feature vector, and the second model may be arranged to perform the speech-to-text conversion based on said part of the feature vector, the output label comprising the text; and wherein said part of the feature vector may comprise the audio field but not the video field.

In other embodiments, one of the plurality of fields may comprise an image field, the values of which comprise image data, and another of the plurality of fields may comprise an inertial sensor data field, the values of which comprise inertial sensor data from one or more sensors measuring motion of a camera while capturing the image data; wherein the first model may be arranged to perform image recognition to detect an object based on the input feature vector, and the second model may be arranged to perform the image recognition based on said part of the input feature vector, the output label comprising an indication of the object; and wherein said part of the feature vector may comprise the image data field but not the inertial sensor data field.

In embodiments the method may comprise, by the first computer equipment in an initial training phase prior to the obtaining of said input data point: obtaining a plurality of initial data points, each comprising a respective set of values of some or all of the fields of said feature vector; sending each of said plurality of initial data points to the second computer equipment, and in response, receiving back associated labels generated by the second model based on the initial data points; and training the first model based on the initial data points and the associated labels received from the second computer equipment.

In embodiments the method may comprise, by the first computer equipment in a subsequent training phase following the sending of the label to the second computer equipment: sending a further data point to the second computer equipment, the further data point comprising values of some or all of the fields of the feature vector, and in response receiving back a further label generated by the second model based on the further data point; and updating the training of the first model based on the further label and further data point.

In embodiments the second model may have a higher complexity than the first model, the higher complexity model consuming more memory and/or processing resources to implement.

In embodiments the second computer equipment may comprise a server system, and the first computer equipment may comprise a client device comprising either a user device or an edge device providing an entry point between one or more user devices and a communication network connecting the user equipment to the server system.

According to another aspect disclosed herein, there is provided a computer program embodied on computer-readable storage and configured so as when run on the client device or other such first computer equipment to perform the method of the client device or first computer equipment according to any embodiment disclosed herein.

According to another aspect there is provided first computer equipment comprising: processing apparatus comprising one or more processing units; and memory comprising one or more memory units, the memory storing a program arranged to run on the processing apparatus; wherein the program is configured so as when run on the processing apparatus to perform the method of the client device or first computer equipment according to any embodiment disclosed herein.

According to another aspect disclosed herein, there is provided a method comprising, by second computer equipment: from first computer equipment, receiving a partial data point being a partial version of a full data point that comprises a set of values, each being a value of a different element of a feature vector, the elements of the feature vector comprising a plurality of subsets of elements, each subset comprising one or more of the elements of the feature vector, wherein the partial data point comprises the values of only part of the feature vector, said part comprising one or more of the subsets of elements but not one or more others of the subsets of elements; in association with the received partial data point, receiving an output label generated by a first machine learning model on the first computer equipment based on the full data point; and training a second machine learning model on the second computer equipment based on the partial data point and the associated label received from the first computer equipment.

In embodiments, the method may further comprise, by the second computer equipment in a subsequent phase following the training of the second model based on the partial data point and associated label: using the second model to generate a new label for a new data point comprising values of some or all of the subsets of elements of the feature vector, and sending the new label to the first computer equipment or other computer equipment to train the first model on said first computer equipment or a further machine learning model on the other computer equipment. Said some or all of the subsets may be said part of the feature vector.

According to another statement of the teachings disclosed herein, there is provided a method comprising, by second computer equipment: from first computer equipment, receiving a partial data point being a partial version of a full data point that comprises a set of values of all elements of a feature vector, each value being a value of a different element of the feature vector, the elements of the feature vector comprising a plurality of fields, each fields comprising one or more of the elements of the feature vector, wherein the partial data point comprises the values of only part of the feature vector, said part comprising one or more of the fields of the feature vector but not one or more others of the fields; in association with the received partial data point, receiving an output label generated by a first machine learning model on the first computer equipment based on the full data point; and training a second machine learning model on the second computer equipment based on the partial data point and the associated label received from the first computer equipment.

In embodiments, the method may comprise, by the second computer equipment in an initial training phase prior to the receiving of said partial data point: receiving a plurality of initial data points from the first computer equipment, each initial data point comprising a respective set of values of some or all of the fields of said feature vector; in response, generating associated labels by inputting the initial data points into the second model, and sending back the associated labels to the first computer equipment, thereby causing the first computer equipment to train the first model based on initial data points and the associated labels sent from the second computer equipment.

In embodiments the method may comprise, by the second computer equipment in a subsequent phase following the training of the second model based on the partial data point and associated label: using the second model to generate a new label for a new data point comprising values of some or all of the fields of the feature vector, and sending the new label to the first computer equipment or other computer equipment to train the first model on said first computer equipment or a further machine learning model on the other computer equipment.

In embodiments the method performed by the second computer equipment may comprises reciprocal steps complementing the client-side method according to any embodiment disclosed herein.

According to another aspect disclosed herein there is provided software embodied on computer-readable storage and configured so as when run on the server system or other such second computer equipment to perform the method of the server system or second computer equipment according to any embodiment disclosed herein.

According to another aspect there is provided a server system or other second computer equipment configured to perform the method of the server or second computer equipment according to any embodiment disclosed herein.

According to yet another aspect there is provided a distributed arrangement of computer equipment, the arrangement comprising the first computer equipment (e.g. client device) and the second computer equipment (e.g. server system) of any embodiment disclosed herein.

Other variants or use cases of the disclosed techniques may become apparent to the person skilled in the art once given the disclosure herein. The scope of the disclosure is not limited by the described embodiments but only by the accompanying claims.

The invention claimed is:

1. A method comprising, by first computer equipment:
obtaining an input data point comprising values of all elements of an input feature vector, wherein each a value corresponds to a different element of the input feature vector, the input feature vector comprising a plurality of fields, each field comprising one or more of the elements of the input feature vector;
inputting the input data point to a first machine learning model on the first computer equipment to generate at least one associated output label based on the input data point;
sending a partial data point to second computer equipment, the partial data point comprising the values of only part of the input feature vector, said part comprising one or more of the fields of the input feature vector but not one or more others of the fields; and
sending the associated output label to the second computer equipment in association with the partial data point, thereby causing the second computer equipment to train a second machine learning model on the second computer equipment based on the partial data point and the associated output label.

2. The method of claim 1, wherein one of the plurality of fields comprises an audio field, the values of which comprise audio data of a person's speech, and another of the plurality of fields comprises a video field, the values of which comprise video data of the person's lips or face while speaking said speech; wherein the first model is arranged to perform speech-to-text conversion based on the input feature vector, and the second model is arranged to perform the speech-to-text conversion based on said part of the input feature vector, the associated output label comprising the text; and wherein said part of the input feature vector comprises the audio field but not the video field.

3. The method of claim 1, wherein one of the plurality of fields comprises an image field, the values of which comprise image data, and another of the plurality of fields comprises an inertial sensor data field, the values of which comprise inertial sensor data from one or more sensors measuring motion of a camera while capturing the image data; wherein the first model is arranged to perform image recognition to detect an object based on the input feature vector, and the second model is arranged to perform the image recognition based on said part of the input feature vector, the associated output label comprising an indication of the object; and wherein said part of the input feature vector comprises the image data field but not the inertial sensor data field.

4. The method of claim 1, comprising, by the first computer equipment in an initial training phase prior to the obtaining of said input data point:
obtaining a plurality of initial data points, each comprising respective values of some or all of the fields of said input feature vector;
sending each of said plurality of initial data points to the second computer equipment, and in response, receiving back associated labels generated by the second model based on the initial data points; and
training the first model based on the initial data points and the associated labels received from the second computer equipment.

5. The method of claim 4, comprising, by the first computer equipment in a subsequent training phase following the sending of the label to the second computer equipment:
sending a further data point to the second computer equipment, the further data point comprising values of some or all of the fields of the input feature vector, and in response receiving back a further label generated by the second model based on the further data point; and
updating the training of the first model based on the further label and further data point.

6. The method of claim 1, further comprising:
prior to sending the input data point to the second computer equipment, receiving a generated output label from the second computer equipment; and
inputting the input data point and the received generated output label to the first machine learning model on the first computer equipment to generate the at least one associated output label.

7. The method of claim 1, further comprising:
determining that the first machine learning model has reached a threshold quality level.

8. The method of claim 7, further comprising:
sending data to the second computer equipment only when the first machine learning model cannot recognize part of the data within the input feature vector.

9. The method of claim 1, wherein the first machine learning model is pre-trained.

10. A method comprising, by second computer equipment:
from first computer equipment, receiving a partial data point being a partial version of a full data point that comprises values of all elements of an input feature vector, each value corresponding to a different element of the input feature vector, the elements of the input feature vector comprising a plurality of fields, each fields comprising one or more of the elements of the input feature vector, wherein the partial data point comprises the values of only part of the input feature vector, said part comprising one or more of the fields of the input feature vector but not one or more others of the fields;
in association with the received partial data point, receiving an output label generated by a first machine learning model on the first computer equipment based on the full data point; and
training a second machine learning model on the second computer equipment based on the partial data point and the output label received from the first computer equipment.

11. The method of claim 10, wherein one of the values of the input feature vector comprises an audio field filed, the values of which comprise audio data of a person's speech, and another of the values of the input feature vector comprises a video field, the values of which comprise video data of the person's lips or face while speaking said speech; wherein the first model is arranged to perform speech-to-text conversion based on the input feature vector, and the second model is arranged to perform the speech-to-text conversion based on said part of the input feature vector, the output label comprising the text; and wherein said part of the input feature vector comprises the audio field but not the video field.

12. The method of claim 10, wherein one of the values of the input feature vector comprises an image field, the values of which comprise image data, and another of the values of the input feature vector comprises an inertial sensor data field, the values of which comprise inertial sensor data from one or more sensors measuring motion of a camera while capturing the image data; wherein the first model is arranged to perform image recognition to detect an object based on the input feature vector, and the second model is arranged to perform the image recognition based on said part of the input feature vector, the output label comprising an indication of the object; and wherein said part of the input feature vector comprises the image field but not the inertial sensor data field.

13. The method of claim 10, comprising, by the second computer equipment in an initial training phase prior to the receiving of said partial data point:

receiving a plurality of initial data points from the first computer equipment, each initial data point comprising a respective set of values of some or all of the fields of said input feature vector; and in response, generating associated labels by inputting the initial data points into the second model, and sending back the associated labels to the first computer equipment, thereby causing the first computer equipment to train the first model based on initial data points and the associated labels sent from the second computer equipment.

14. The method of claim 10, comprising, by the second computer equipment in a subsequent phase following the training of the second model based on the partial data point and associated label:

using the second model to generate a new label for a new data point comprising values of some or all of the fields of the input feature vector, and sending the new label to the first computer equipment or other computer equipment to train the first model on said first computer equipment or a further machine learning model on the other computer equipment.

15. The method of claim 10, further comprising:

prior to receiving the partial data point from the first computer equipment, generating the output label; and sending the generated output label to the first computer equipment.

16. A system comprising:

first computer equipment including a first computer storage medium storing computer-executable instructions that, upon execution by a first processor, cause the first processor to perform operations comprising:

obtaining an input data point comprising values of all elements of an input feature vector, wherein each value corresponds to a different element of the input feature vector, the input feature vector comprising a plurality of fields, each field comprising one or more of the elements of the input feature vector;

inputting the input data point to a first machine learning model on the first computer equipment to generate at least one associated output label based on the input data point;

sending a partial data point to second computer equipment, the partial data point comprising the values of only part of the input feature vector, said part comprising one or more of the fields of the input feature vector but not one or more others of the fields; and sending the associated label to the second computer equipment in association with the partial data point; and second computer equipment including a second computer storage medium storing computer-executable instructions that, upon execution by a second processor, cause the second processor to perform operations comprising:

receiving the partial data point from the first computer equipment;

receiving the associated label from the first computer equipment; and training a second machine learning model on the second computer equipment based on the partial data point and the associated label.

17. The system of claim 16, wherein the computer-executable instructions further cause the first processor to perform operations comprising:

prior to sending the input data point to the second computer equipment, receiving a generated output label from the second computer equipment; and inputting the input data point and the received generated output label to the first machine learning model on the first computer equipment to generate the at least one associated output label.

18. The system of claim 16, wherein the computer-executable instructions further cause the first processor to perform operations comprising:

determining that the first machine learning model has reached a threshold quality level.

19. The system of claim 18, wherein the computer-executable instructions further cause the first processor to perform operations comprising:

sending data to the second computer equipment only when the first machine learning model cannot recognize part of the data within the input feature vector.

20. The system of claim 16, wherein the first machine learning model is pre-trained.

* * * * *